United States Patent Office 3,384,545
Patented May 21, 1968

3,384,545
INJECTABLE AQUEOUS EMULSIONS OF FAT SOLUBLE VITAMINS
Ronald Eugene Aiello, Belleville, and Jacob Christopher Bauernfeind, Glen Rock, N.J., assignors to Hoffmann-La Roche Inc., Nutley, N.J., a corporation of New Jersey
No Drawing. Filed Mar. 9, 1965, Ser. No. 438,372
16 Claims. (Cl. 167—81)

This invention relates in general, to vitamin-containing compositions and to the manufacture and use thereof. More particularly, the invention relates to injectable compositions, in the form of aqueous emulsions, which contain a fat-soluble vitamin, or a mixture of fat-soluble vitamins, as the active ingredient thereof, and to the preparation and use of such compositions.

The use of vitamin-containing compositions as supplements in poultry and animal feed and food is well known in the art. These vitamin supplements have, in the past, been provided in a variety of forms. Thus, for example, vitamin supplements have been furnished as beadlets, suitable for mixing with the animal or poultry food and feeds. Other vitamin supplements have been provided in the form of water-dispersible powders, suitable for addition to the drinking water of the animals and poultry. Additionally, liquid products, capable of being sprayed on the animal and poultry feed, have been made available by the art. Of recent date, however, particular interest has been observed in the development of vitamin-containing compositions which are suitable for parenteral administration. Many products of this nature are presently commercially available.

To some extent, at least, certain of the prior art products have been found to be satisfactory for parenteral administration. In a number of instances, however, the parenteral products of the art have been found to leave much to be desired. For example, certain of these products have been found to be biologically ineffective when administered parenterally to animals and poultry. Many cause considerable tissue damage when administered by injection. For obvious reasons, either of these attributes diminish greatly the usefulness of the products.

Thus, in its most comprehensive embodiment, the present invention provides novel vitamin-containing compositions.

In a more limited embodiment, the invention provides fat-soluble vitamin-containing compositions which are completely biologically effective and which can be administered parenterally with a minimum of tissue damage.

It has been found that aqueous emulsions, which are formulated in the manner described hereinafter, containing (1) a fat-soluble vitamin, or a mixture of fat-soluble vitamins, (2) glycerine, (3) an edible emulsifying agent and (4) water, are completely biologically effective when administered parenterally. Furthermore, it has been found that, when so administered, such emulsions cause little or no tissue damage. The emulsions of this invention, accordingly, are useful as parenteral compositions to supply the vitamin requirements of animals and poultry. The properties and characteristics thereof render the present products especially well suited for use in providing the vitamin requirements of small animals, such as, cats, dogs, etc., although it should be fully understood that the utility of the products is not restricted to the treatment of such small animals.

As the vitamin component of the present products, there is used vitamin A palmitate, vitamin $D_2$, vitamin $D_3$ or vitamin E. Mixtures of two or more of these vitamins can be used, if desired. As the vitamin E component there can be employed d-α-tocopherol, dl-α-tocopherol or an ester thereof, such as, d-α-tocopheryl acetate, d-α-tocopheryl succinate, dl-α-tocopheryl acetate, dl-α-tocopheryl succinate, etc. For convenience, all of such sources of vitamin E activity will be referred to hereinafter collectively merely as vitamin E. From the foregoing, it will be appreciated that the present invention embraces compositions containing vitamin A palmitate, vitamin $D_2$, vitamin $D_3$ or vitamin E as the sole vitamin component, as well as compositions containing all conceivable combinations of those vitamins. The preferred products of the invention contain vitamin A palmitate alone, vitamin E alone, a combination of vitamin A palmitate and vitamin E and a combination of vitamin A palmitate, vitamin $D_3$ and vitamin E.

The quantity of vitamin component which is used in carrying out this invention is variable within rather wide limits. In general, the amount of vitamin component employed will be determined by the potency of the vitamin source employed and the vitamin potency to be achieved in the final product. In no instance, however, will the vitamin component or components comprise more than about 12.0% of the weight of the final product, i.e., the aqueous emulsion.

In one specific embodiment of the invention there is produced a product, in the form of an aqueous emulsion, containing from about 50,000 to 150,000 I.U. per ml. of vitamin A palmitate. In another specific embodiment of the invention there is produced a product, in the form of an aqueous emulsion, containing from about 50 to 200 I.U. per ml. of vitamin E. In still another preferred embodiment of the invention, there is produced a product, in the form of an aqueous emulsion, containing from about 50,000 to 100,000 I.U. per ml. of vitamin A palmitate, from about 5,000 to 30,000 I.U. per ml. of vitamin $D_2$ and from about 10 to 50 I.U. per ml. of vitamin E. In another embodiment of the invention, there is produced a product containing from about 50,000 to 150,000 I.U. per ml. of vitamin A palmitate and from about 50 to 200 I.U. per ml. of vitamin E.

As the emulsifying agent in the formulation of the present compositions there is used a polyoxyethylene ether of castor oil. Products of this type are prepared by reacting ethylene oxide and castor oil in a ratio of about 20 to 40 moles of ethylene oxide per mole of castor oil. The ether linkage is formed with the hydroxy groups of ricinoleic acid component of castor oil. Included among the emulsifying agents which are suitable for use are those polyoxyethylene ethers of castor oil which are marketed under the trade name Emulphor, for example, Emulphor EL–620 and Emulphor EL–719; the polyoxyethylene ether of castor oil which is marketed under the trade name Prosol E–4329; the polyoxyethylene ether of castor oil which is marketed under the trade name Cremaphor; and the polyoxyethylene ether of castor oil which is marketed under the trade name Lipal 25–C. The quantity of emulsifying agent which is used in producing the aqueous emulsions of this invention is variable. In general, the emulsifier will comprise from about 8% to about 25% of the final product, in emulsion form. Preferably, however, the emulsifier will comprise from about 14% to about 20% of the weight of the product. In no event, however, will the weight of the emulsifying agent in the emulsion exceed about three times the weight of the vitamin component, or components, present in the product.

The third essential component of the present compositions is glycerine. The quantity of glycerine which is incorporated into the products can be varied within relatively wide limits. Thus, for example, the products can contain as little as about 4% by weight and as much as about 44% by weight of glycerine. However, the aqueous emulsions which are produced in the preferred embodiment of the invention contain from about 6% to about 10% by weight of glycerine.

The fourth essential component of the composition of this invention is water. The quantity of water which is used in preparing these compositions can be varied within relatively wide limits. For example, the final products, in the form of an aqueous emulsion, can contain as little as about 15% by weight of water and they can contain up to about 85% by weight of water. The emulsions which are produced in the preferred practice of the invention contain, however, from about 50% to about 75% by weight of water.

In addition to the essential ingredients enumerated heretofore, the compositions of this invention can contain preservatives, antioxidants and other adjuvants and excipients which are customarily found in parenteral compositions. In general, any conventional nontoxic preservative or any conventional nontoxic antioxidant can be used in formulating the products. As the preservatives there is used, preferably, a mercurial compound, such as, sodium ethylmercurithiosalicylate which is marketed under the trade name Thimerosal. In the alternative, benzyl alcohol, chlorobenzyl alcohol, dichlorobenzyl alcohol, chlorobutanol, phenol, methyl p-hydroxybenzoate, propyl, p-hydroxy benzoate, etc. all of which are known preservatives, can be employed. Additionally, quaternary compounds which have the known preservative properties can be used.

Furthermore, the present invention comprehends the use of a nontoxic antioxidant as an optional ingredient. Suitable for use are antioxidants, such as, butylated hydroxyanisole, butylated hydroxytoluene, propyl gallate, $\alpha$-tocopherol, ascorbic acid, alkali metal salts of ascorbic acid, etc. Mixtures of such antioxidants can be used, if desired. While an antioxidant is an optional component of the products of this invention, it is preferred to incorporate an antioxidant, or a mixture of antioxidants, into those compositions which contain vitamin A palmitate, either alone or in admixture with other fat-soluble vitamins. In preparing the preferred products of this invention, an antioxidant mixture, comprising equal parts by weight of butylated hydroxyanisole and butylated hydroxytoluene, is employed.

The quantities of preservative and the amount of antioxidant which is incorporated into the aqueous emulsions of this invention is variable. The preservative which is used in the preferred practice of the invention, i.e., Thimerosal, comprises normally up to about 0.01% of the weight of the final product, in emulsion form. The preferred antioxidant, i.e., the mixture of butylated hydroxyanisole and butylated hydroxytoluene ordinarily comprises up to about 0.3% of the weight of the final product, in emulsion form.

In addition to the essential ingredients and optional components enumerated heretofore, the aqueous emulsions of this invention can contain other ingredients which are commonly found in injectable compositions. These include, for example, the disodium salt of ethylene diamine tetra-acetic acid, sodium acetate, acetic acid, etc.

The compositions of this invention are readily prepared. In general, the preparative method comprises blending the vitamin component, glycerine and the emulsifying agent, either in the presence or absence of the optional antioxidant and subsequently, emulsifying the blend in water. If desired, the blending and emulsifying steps can be carried out at ordinary room temperatures. However, in certain instances, these operations will be facilitated when carried out at elevated temperatures, for example, at temperatures within the range of from about 30° C. to about 85° C.

As indicated heretofore, the compositions of this invention are aqueous emulsions which are suitable for parenteral administration. The viscosity of the emulsion is variable, depending primarily upon the ratio of vitamin, glycerine, emulsifier and optional ingredients, to water present therein. The viscosity of the emulsion should be suitably adjusted so as to allow for the free-flow of the product through the injection needle. For example, where a 22 gauge needle is to be used in administering the composition, it has been found that the viscosity of the composition, as determined using an Oswald pipette, should not exceed, at a temperature of about 25° C., about 33 centiposes. At that viscosity, or at a lower viscosity, the composition flows readily through the 22 gauge needle during the injection process.

The present produts are useful in supplying the fat-soluble vitamin requirements of animals and poultry. While they are particularly useful in the treatment of the so-called "small animals," such as, cats, dogs, calves, lambs, pigs, etc., they are useful also in the treatment of the larger animals, for example, horses, beef cattle, sheep, etc. When administered parenterally, the products of this invention cause little or no tissue damage. Moreover, when administered parenterally, the products are completely biologically effective. The precise manner in which the present compositions are used, and the dosage levels to be employed, will be immediately apparent to persons skilled in the art.

For a fuller undertsanding of the nature and objects of this invention, reference may be had to the following examples which are given merely as an illustration and are not to be construed in a limiting sense.

EXAMPLE 1

In this example, 1.3 mg. of butylated hydroxy toluene, 1.3 mg. of butylated hydroxy anisole and 0.65 mg. of vitamin $D_3$ were added to, and heated to a temperature of about 85° C., in 32 mg. of Emulphor EL–620. Thereafter, the mixture was cooled to a temperature of about 40° C. At that temperature, there was added to the mixture 128 mg. of Emulphor EL–620, 75 mg. of vitamin A palmitate, 24 mg. of vitamin E, i.e., dl-tocopheryl acetate, and 72 mg. of glycerine. Thereafter, the mixture was maintained at a temperature of about 40° C. and 75 mg. of distilled water, preheated to a temperature of 40° C., was added thereto. The liquid mixture was stirred until clear. Subsequently, 565 mg. of distilled water was added to, and stirred into the liquid mixture, following which the following named ingredients were added thereto in the quantities hereinafter set forth:

| | Mg. |
|---|---|
| Thimerosal | 0.1 |
| Disodium ethylenediamine-tetra-acetic acid | 0.1 |
| Sodium acetate | 0.4 |
| Acetic acid | 0.1 |

After such addition was complete, the volume of the product was adjusted to 1.0 ml. with distilled water. There was obtained by this procedure a vitamin A, $D_3$ and E-containing emulsion suitable for administration to animals and poultry by parenteral means. When administered parenterally the product was completely biologically available and it did not cause tissue irritation.

EXAMPLE 2

In this example, 110 mg. of dl-tocopherol, 150 mg. of Emulphor EL–620 and 80 mg. of glycerin were mixed in a suitable vessel. To this mixture there was added slowly 75 mg. of distilled water. The liquid product was stirred until clear. Thereafter, an additional 545 mg. of distilled water was added to the liquid product, following which the following named ingredients, in the quantities hereinafter indicated, were added:

| | Mg. |
|---|---|
| Thimeorsal | 0.1 |
| Disodium salt of ethylenediamine-tetra-acetic acid | 0.1 |
| Sodium acetate | 0.4 |
| Acetic acid | 0.1 |

Thereafter, the volume of the product was adjusted to 1.0 ml. with distilled water. An aqueous emulsion, containing dl-tocopherol as the active ingredient, was obtained. This emulsion was found to be extremely well suited for administration, by parenteral means, to animals

EXAMPLE 3

In this example, a parenteral composition, containing vitamin A palmitate as the active ingredient, was prepared. The preparative method was the same as that described in Example 1. In producing this compositon, the following named ingredients in the quantities hereinafter indicated were used:

|  | Mg. |
|---|---|
| Vitamin A palmitate | 75.0 |
| Butylated hydroxytoluene | 1.3 |
| Butylated hydroxyanisole | 1.3 |
| Prosol E-4329 | 160.0 |
| Glycerin | 72.0 |
| Thimerosal | 0.1 |
| Disodium salt of ethylenediamine-tetra-acetic acid | 0.1 |
| Sodium acetate | 0.4 |
| Acetic acid | 0.1 |
| Distilled water, qs. to 1 ml. | |

There was, thus obtained, a composition containing vitamin A palmitate which was suitable for administration to animals or poultry by parenteral means. When so administered, the product was found to be completely biologically available and its administration did not cause tissue irritation.

EXAMPLE 4

This example is included herein to demonstrate the production of a parenteral composition containing, as the active ingredients thereof, vitamin A palmitate and d-α-tocopheryl acetate.

The composition was prepared by the procedure described in Example 1, using the following named ingredients in the quantities hereinafter indicated:

|  | Mg. |
|---|---|
| Vitamin A palmitate | 75.0 |
| d-α-tocopheryl acetate | 18.0 |
| Lipal 25-C | 160.0 |
| Butylated hydroxytoluene | 1.3 |
| Butylated hydroxyanisole | 1.3 |
| Glycerin | 72.0 |
| Thimerosal | 0.1 |
| Disodium salt of ethylenediamine-tetra-acetic acid | 0.1 |
| Sodium acetate | 0.4 |
| Acetic acid | 0.1 |
| Distilled water, qs. to 1 ml. | |

There was obtained by this method an aqueous emulsion containing vitamin A palmitate and dl-α-tocopheryl acetate as the active ingredients. The composition was found to be suitable for parenteral administration to animals and poultry. When administered parenterally, the product was completely biologically available and did not cause significant tissue damage.

EXAMPLE 5

This example is included herein to demonstrate the production of a parenteral composition containing vitamin A palmitate and vitamin $D_2$, i.e., calciferol, as the active ingredients.

In the preparative method, 0.3 mg. of calciferol, 1.3 mg. of butylated hydroxytoluene, 1.3 mg. of butylated hydroxyanisole were dissolved, at a temperature of about 85° C., in about 32.0 mg. of Emulphor EL-620. After the dissolution was complete, the product was cooled to a temperature of about 50° C. and there was added thereto 128 mg. of Emulphor EL-620, 75 mg. of vitamin A palmitate and 72 mg. of glycerin. The mixture was maintained at a temperature of about 50° C. and 75 mg. of distilled water, preheated to a temperature of about 50° C., was added. The mixture was then stirred until clear. The clear liquid product, which was thus obtained, was then added to 583.0 mg. of distilled water, preheated to a temperature of 50° C. Thereafter, 0.1 mg. of Thimerosal, 0.1 mg. of disodium salt of ethylenediaminetetraacetic acid, 0.4 mg. of sodium acetic acid was added. Finally, the volume of the product was adjusted to 1 ml. with distilled water. There was thus obtained an aqueous emulsion which was suitable for administration, by parenteral means, to animals and poultry. The product was completely biologically available when administered parenterally and, when so administered, it was non-irritating to the animal and poultry.

We claim:

1. An aqueous emulsion comprising (a) up to about 12% by weight of a member selected from the group consisting of vitamin A palmitate, vitamin D and vitamin E and mixtures thereof, (b) from about 8% to about 25% by weight of a polyoxyethylene ether of castor oil containing about 20 to 40 moles of ethylene oxide per mole of castor oil, (c) from about 4% to about 44% by weight of glycerin and (d) from about 15% to about 85% by weight of water, the quantity of said component (b) which is present in said emulsion not exceeding about three times the weight of said component (a).

2. The composition of claim 1 wherein there is also present a nontoxic preservative.

3. The composition of claim 2 wherein there is also present a nontoxic antioxidant.

4. An aqueous emulsion comprising (a) up to about 12% by weight of a member selected from the group consisting of vitamin A palmitate, vitamin D and vitamin E and mixtures thereof, (b) from about 14% to about 20% by weight of a polyoxyethylene ether of castor oil containing about 20 to 40 moles of ethylene oxide per mole of castor oil, (c) from about 6% to about 10% by weight of glycerin and (d) from about 50% to about 75% by weight of water, the quantity of said component (b) which is present in said emulsion not exceeding about three times the weight of said component (a).

5. The composition of claim 4 wherein there is also present a nontoxic preservative.

6. The composition of claim 5 wherein there is also present a nontoxic antioxidant.

7. An aqueous emulsion comprising (a) up to about 12% by weight of a mixture of vitamin A palmitate and vitamin $D_3$, (b) from about 14% to about 20% by weight of a polyoxyethylene ether of castor oil containing about 20 to 40 moles of ethylene oxide per mole of castor oil, (c) from about 6% to about 10% by weight of glycerin, and (d) from about 50% to about 75% by weight of water and (e) a nontoxic preservative, the quantity of said component (b) which is present in said emulsion not exceeding about three times the weight of said component (a).

8. The composition of claim 7 wherein there is also present a nontoxic antioxidant.

9. An aqueous emulsion comprising (a) up to about 12% by weight of vitamin E, (b) from about 14% to about 20% by weight of a polyoxyethylene ether of castor oil containing about 20 to 40 moles of ethylene oxide per mole of castor oil, (c) from about 6% to about 10% by weight of glycerin and (d) from about 50% to about 75% by weight of water, the quantity of said component (b) present in said emulsion not exceeding about three times the weight of said component (a).

10. The composition of claim 9 wherein there is also present a nontoxic preservative.

11. An aqueous emulsion comprising (a) up to about 12% by weight of vitamin A palmitate, (b) from about 10% to about 20% by weight of a polyoxyethylene ether of castor oil containing about 20 to 40 moles of ethylene oxide per mole of castor oil, (c) from about 6% to about 10% of glycerin, (d) from about 50% to about 75% by weight of water and (e) a nontoxic preservative, the quantity of said component (b) present in said emulsion not exceeding three times the weight of said component (a).

12. The composition of claim 11 wherein there is also present a nontoxic antioxidant.

13. An aqueous emulsion comprising (a) up to about 12% by weight of a mixture of vitamin A palmitate and vitamin E, (b) from about 14% to about 20% by weight of a polyoxyethylene ether of castor oil containing about 20 to 40 moles of ethylene oxide per mole of castor oil, (c) from about 6% to about 10% by weight of glycerin, (d) from about 50% to about 75% by weight of water and (e) a nontoxic preservative, there being present in said emulsion a quantity of component (b) not exceeding about three times the weight of said component (a).

14. The composition of claim 13 wherein there is also present a nontoxic antioxidant.

15. An aqueous emulsion comprising (a) up to about 12% by weight of a mixture of vitamin A palmitate and vitamin $D_2$, (b) from about 14% to about 20% by weight of a polyoxethylene ether of castor oil containing about 20 to 40 moles of ethylene oxide per mole of castor oil, (c) from about 6% to about 10% of glycerine, (d) from about 50% to about 75% by weight of water and (e) a nontoxic preservative, the quantity of said component (b) which is present in said emulsion not exceeding about three times the weight of said component (a).

16. A composition of claim 15 wherein there is also present a nontoxic antioxidant.

References Cited

UNITED STATES PATENTS

| | | | |
|---|---|---|---|
| 2,907,696 | 10/1959 | Stieg et al. | 167—81 |
| 3,070,499 | 12/1962 | Mullins et al. | 167—81 |
| 3,244,595 | 4/1966 | Feigh | 167—81 |

FOREIGN PATENTS

| | | |
|---|---|---|
| 499,831 | 2/1954 | Canada. |
| 706,607 | 3/1954 | Great Britain. |
| 710,817 | 6/1954 | Great Britain. |
| 712,505 | 7/1954 | Great Britain. |

OTHER REFERENCES

Mima, Pharm. Soc. of Japan, vol. 78, pp. 381–386, 1958.

RICHARD L. HUFF, Primary Examiner.

LEWIS GOTTS, Examiner.